US005389414A

United States Patent [19]

Popat

[11] Patent Number: 5,389,414

[45] Date of Patent: Feb. 14, 1995

[54] DIVISIBLE LASER LABEL SHEET

[75] Inventor: Ghanshyam H. Popat, Alta Loma, Calif.

[73] Assignee: Avery Dennison Corporation, Pasadena, Calif.

[21] Appl. No.: 63,213

[22] Filed: May 17, 1993

[51] Int. Cl.[6] .................... B32B 31/00

[52] U.S. Cl. .................... 428/40; 428/43; 283/101; 283/103; 283/105

[58] Field of Search .................... 428/40, 41, 42, 43; 271/1; 283/101, 103, 105, 109, 117

[56] References Cited

U.S. PATENT DOCUMENTS

| | | | |
|---|---|---|---|
| 3,993,814 | 11/1976 | Cavender | 283/101 |
| 4,033,611 | 7/1977 | Johnsen . | |
| 4,515,077 | 5/1985 | Davidson et al. | 283/117 |
| 4,637,635 | 1/1987 | Levine . | |
| 4,814,216 | 3/1989 | Brunett et al. | 428/43 |
| 4,952,433 | 8/1990 | Tezuka et al. . | |
| 5,033,252 | 7/1991 | Carter | 53/425 |
| 5,129,682 | 7/1992 | Ashby | 283/101 |
| 5,147,699 | 9/1992 | Browning et al. . | |
| 5,200,242 | 4/1993 | Hohmann | 428/43 |
| 5,209,514 | 5/1993 | Hebert | 283/109 |
| 5,227,209 | 7/1993 | Garland | 428/43 |

OTHER PUBLICATIONS

Avery Product 5360 Copier Label Brochure® 1988 and Exhibit.

*Primary Examiner*—Chester T. Barry
*Attorney, Agent, or Firm*—Poms. Smith, Lande & Rose

[57] ABSTRACT

A double thickness label assembly has a label layer having a pressure sensitive adhesive mounted on a backing layer. The backing layer has a release coating for removal of the labels. The label assembly is divided into two or more sections by perforations that extend through both layers of the assembly. Each individual section is designed to have increased flexibility at its leading edge by means of die cut and/or perforated lines so that the section can feed through a laser printer without getting jammed. The user may choose to either print the sheet in its entirety, or may print one or more sections and save the remainder of the sheet for later use. A convenient method of preparing small sets of labels uses a divisible sheet of labels that is divided into sections by perforations. A user first divides the sheet into the sections. Each section includes a number of die cut labels. The user then adjusts the feeding mechanism on a laser printer to the width of the section sheets, then prints the labels on the section sheets.

11 Claims, 3 Drawing Sheets

FIG. 6
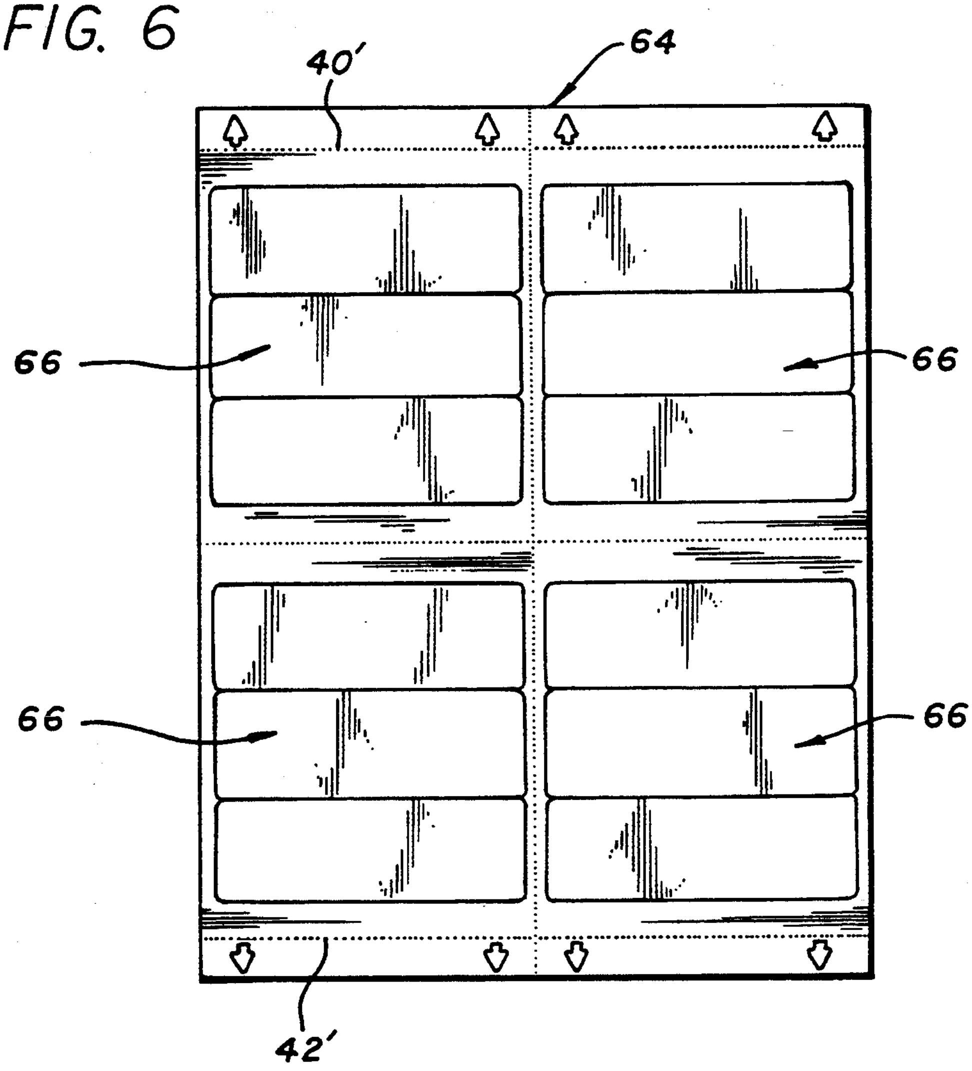
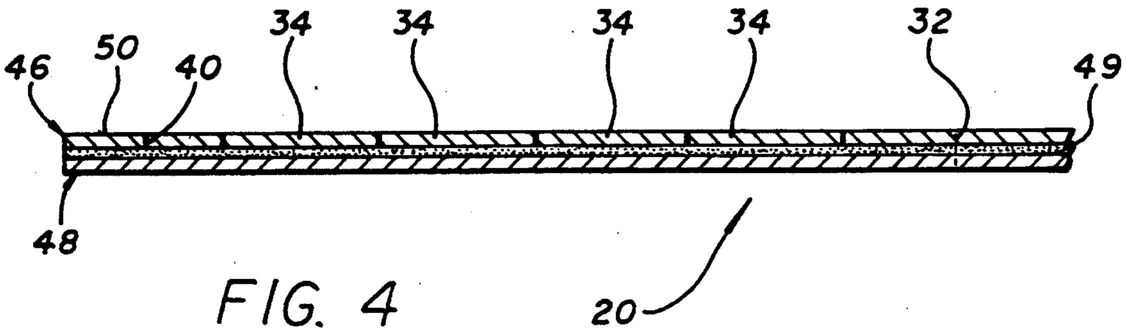
FIG. 4

DIVISIBLE LASER LABEL SHEET

FIELD OF THE INVENTION

The present invention relates generally to a multiple purpose, double thickness label sheet assembly that may be divided into subsections for printing small numbers of labels with a laser printer, and to a method for printing such labels.

BACKGROUND OF THE INVENTION

Laser printers have spawned a wide variety of options for personal printing that have not existed previously. A personal computer user can now prepare text on a word processing program and print the text directly onto sheets that pass through the laser printer. Such sheets may consist of labels applied to a backing sheet, or may be made of card stock for cutting into business cards. The sheets are typically 8½×11 inches in dimension and may be fed into the laser printer through a standard paper tray.

With experience, users have encountered difficulties with full-sized sheets of labels. The sheets typically cannot be run through a laser printer more than once because excess toner tends to build up on the blank areas of the sheet. Furthermore, the complex paper path that the sheet must follow tends to distort the desired flat surface of the sheet on subsequent passes through the printer, particularly if some labels have been removed. Consequently, if only a small number of labels are to be printed, the rest of the labels are wasted; and the user ends up paying for labels that are never used.

With the introduction of adjustable manual feed guides such as those found on the Hewlett Packard Laserjet II and III laser printers and similar laser printers, users may now print on envelopes or other sheets smaller than the typical 8½×11 inch full sheet size. However, to print smaller numbers of labels users would have to manually cut smaller sections of labels from the full 8½×11 inch sheet. Additionally, such hand made smaller sections of double thickness sheets would tend to become jammed in the printer.

SUMMARY OF THE INVENTION

There are six important objects of the present invention. First, it is an object of the present invention to provide a label product that allows a user the choice of laser printing a full-sized sheet when a large number of labels is desired, or to print a smaller section of a full sheet when a smaller number of labels is desired.

Second, it is an object of the present invention to provide an environmentally efficient product which allows a user to print a small number of labels without having to dispose of extra, unused labels.

Third, it is an object of the present invention to provide a subdividable sheet wherein each subdivision is sufficiently flexible for printing in a laser printer.

Fourth, it is an object to provide a subdividable sheet of labels having a temperature stable adhesive appropriate for the high-heat environment of a laser printer. Fifth, the label product should provide space efficient storage. Additionally, it is an object of the present invention to provide a convenient method for preparing labels with a laser printer.

Generally stated, a label assembly that satisfies these objects is provided in a double thickness sheet having a smooth, continuous surface suitable for laser printing. The sheet is divided into a several sections by perforations that extend through the sheet. Each individual section is designed to have increased flexibility at its leading edge by means of die cut and/or perforated lines so that the section can feed through a laser printer without getting jammed. The user may choose to either print the sheet in its entirety, or may print one or more sections and save the remainder of the sheet for later use.

In accordance with other aspects of the present invention, the label sheet assembly may have a label layer having a pressure sensitive adhesive mounted on a backing layer having a release coating for easy removal of the pressure sensitive labels. Each section may include labels that have been die cut from the label layer. The pressure sensitive adhesive of the label layer should be stable up to temperatures of 200 degrees Fahrenheit to withstand the high heat of the interior of the laser printer.

In accordance with another aspect of the present invention, a multiple purpose, double thickness label assembly may have a divisible backing sheet. A divisible label sheet with a pressure sensitive adhesive coating may be mounted on the backing sheet. The double thickness label sheet assembly may be divided into two or more sections by perforations that extend through both of the sheets. Each of these sections may have two or more die cut labels thereon, with the die cuts extending through the label sheet but not the backing sheet. Each section may also have a flexible edge so that the section may be fed through a laser printer. The double-thickness label sheet assembly may be printed in its entirety by a laser printer, or may be divided into the sections and separately fed into the laser printer.

A convenient method of preparing small sets of labels uses a divisible sheet of labels that is divided into sections by perforations. A user first divides the sheet into the sections. Each section includes a number of die cut labels. The user then adjusts the feeding mechanism on a laser printer to the width of the section sheets. The user then feeds a section sheet into the laser printer to print the labels.

As is apparent from the foregoing description, the present label assembly and the associated method for preparing small sets of labels readily satisfy the objects of the invention. The subdividable label assembly allows a user the choice of laser printing a full-sized sheet when a large number of labels is desired, or to print a smaller section of a full sheet when a smaller number of labels is desired. The assembly is environmentally efficient in that a small number of labels may be printed without having to dispose of extra, unused labels. The flexible leading edge of each subdivision is sufficiently flexible to provide for printing in a laser printer without jamming. The temperature stable adhesive can withstand the high-heat environment of a laser printer. The label product may be efficiently stored on 8½ by 11 inch sheets, or larger. Additionally, the method for preparing small sets of labels is convenient for anyone having access to a computer and laser printer.

Other objects, features, and advantages of the invention will become apparent from a consideration of the following detailed description and the accompanying drawings.

BRIEF DESCRIPTION OF THE DRAWINGS

FIG. 4 is a sectional view taken along section 4—4 of FIG. 1 showing the die cut labels adhering to an underlying backing sheet;

FIG. 6 is a front elevational view showing a full-sized sheet having separable sections each having three labels.

DETAILED DESCRIPTION OF THE PREFERRED EMBODIMENTS

Figure 1:
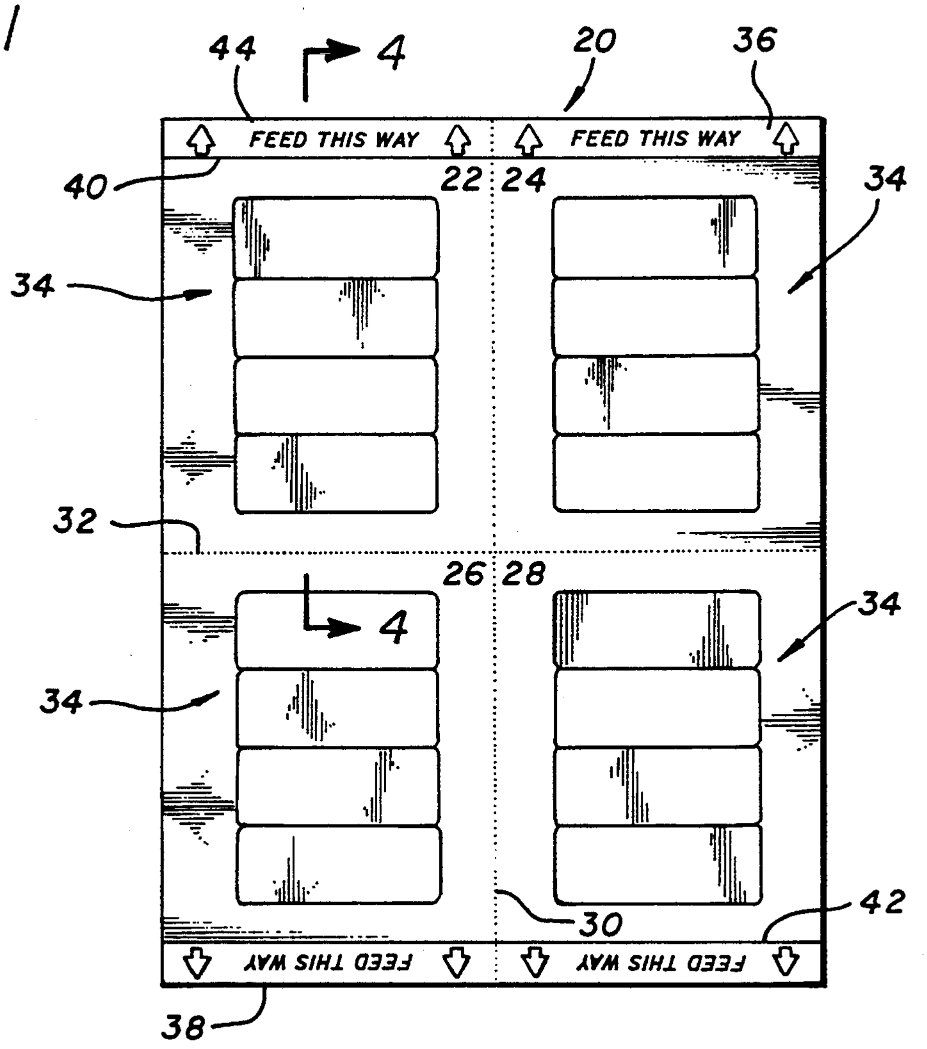
FIG. 1 is a front elevational view showing a full-sized label sheet having four separable sections each having four labels.

Referring more particularly to the drawings, FIG. 1 illustrates a presently preferred embodiment of a double thickness label sheet assembly. The label sheet 20 is divided into four subsections 22, 24, 26, and 28, which are separated by perpendicular lines of microperforations 30 and 32. Each subsection includes a set of labels 34 that is generally centered within the subsection. Leading edge portions 36 and 38 comprise die cut flexibility lines 40 and 42, and indicia 44 to indicate the proper direction for feeding a label subsection into a laser printer, such as that illustrated in FIG. 2.

FIG. 4 is a cross-sectional view of subsection 22 taken along section 4—4 of FIG. 1. FIG. 4 shows that the label assembly 20 includes a label layer 46 which is mounted on a backing layer 48. The label sheet has a pressure sensitive adhesive coating 49 which allows the label sheet to mount onto the backing layer 48, which has a silicone release coating to permit a user to remove labels from the backing layer. The release coating may alternately be fluorinated or amine-based rather than silicone, or may be any other suitable coating.

The adhesive coating should be stable in the presence of temperatures up to about 200 degrees Fahrenheit to withstand the significant heat generated in the interior of the laser printer. The adhesive may be PO9 acrylic adhesive sold by Avery Dennison Corporation, or a rubber based adhesive of styrene butadiene and ABA block copolymers compounded with tackifying resins. However, it is important to note that any suitable stable, pressure sensitive adhesive may be used which facilitates printing at high temperatures and peeling the labels from the backing layer 48.

FIG. 4 also shows that flexibility line 40 is die cut through label layer 46, but not through backing sheet 48. The purpose of the flexibility line is to allow the leading edge 50 to easily bend around the various twists and turns in a conventional laser printer feed path. Consequently, flexibility line 40 has the effect of avoiding paper jamming which may occur with sheets having more rigid leading edges. Flexibility line 40 may alternatively represent means for increasing flexibility by way of perforations passing through both the label sheet and the backing sheet, and die cut lines passing through the label sheet.

Label set 34 is die cut out of the label layer 46. As seen in FIG. 4, the die cuts pass through the label layer but not the backing layer. Thus, the backing layer is left intact when the labels are removed.

FIG. 4 also shows perforation line 32, which separates subsection 22 from subsection 26. The perforation line 32 passes through both label layer 46 and backing layer 48, so that subsection 22 can be completely separated from subsection 26. The perforations are preferably closely spaced "microperforations" which leave a relatively smooth edge when the subsections are separated.

Figure 2:
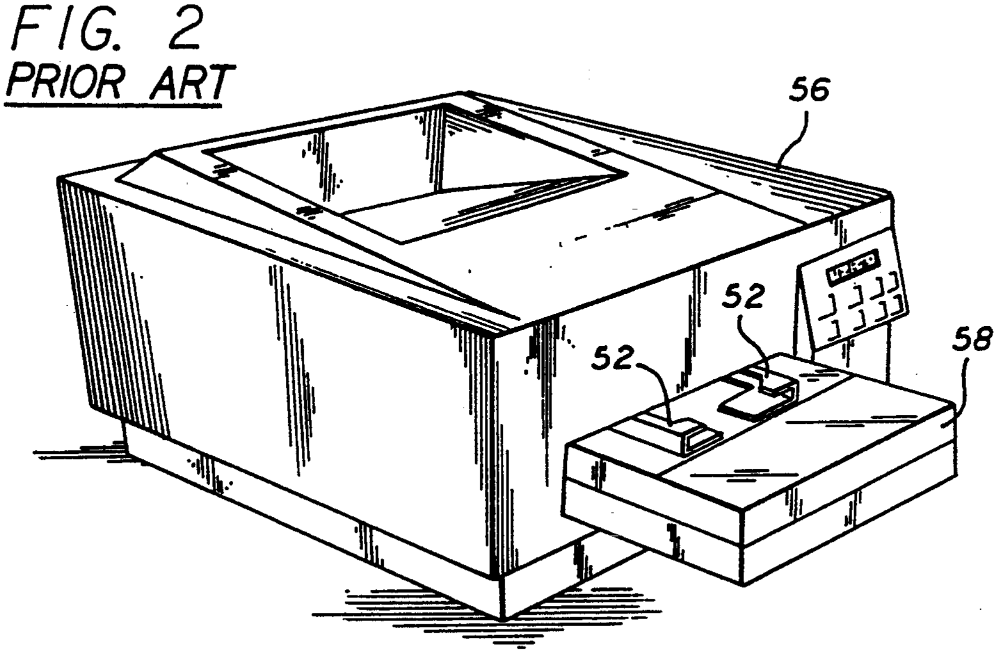
FIG. 2 PRIOR ART
FIG. 2 is a perspective view of a conventional laser printer having an adapter for printing sheets having dimensions less than standard sheet size.
Figure 3:
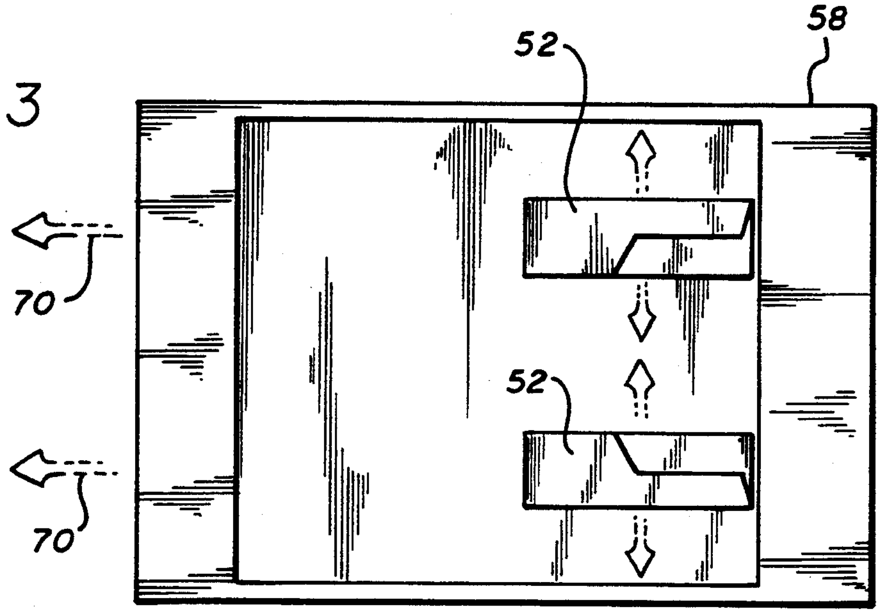
FIG. 3 is a top perspective view of a laser printer paper tray having adjustable manual feed guides which can be adjusted to accommodate a section of labels having dimensions less than $8\frac{1}{2} \times 11$ inches.

FIG. 2 illustrates a typical laser printer 56 having a paper tray 58. Full sized sheets of paper or labels may be stored inside the paper tray for automatic feeding into the laser printer. Alternately, paper or label sheets may be fed into the printer manually at adjustable manual feed guides 52, which are shown more clearly in FIG. 3. These feed guides may be adjusted to guide sheets of various widths into the laser printer for printing. Consequently, the feed guides can be adjusted to accommodate a subsection of label sheet 20 for printing. Arrows 70 indicate the direction in which labels feed into laser printer 56.

An illustrative method of preparing small sets of labels from label sheet 20 is as follows. The user divides label sheet 20 into quarters along perforation lines 30 and 32, such that subsections 22–28 are separated from each other. The user then adjusts manual feed guides 52 on laser printer paper feed tray 54 to accommodate the non-conventional width of an individual subsection of label sheet 20. The user inserts a subsection of the label sheet into the manual feed guide, then sends a print command to the laser printer 56 to initiate printing.

Figure 5:
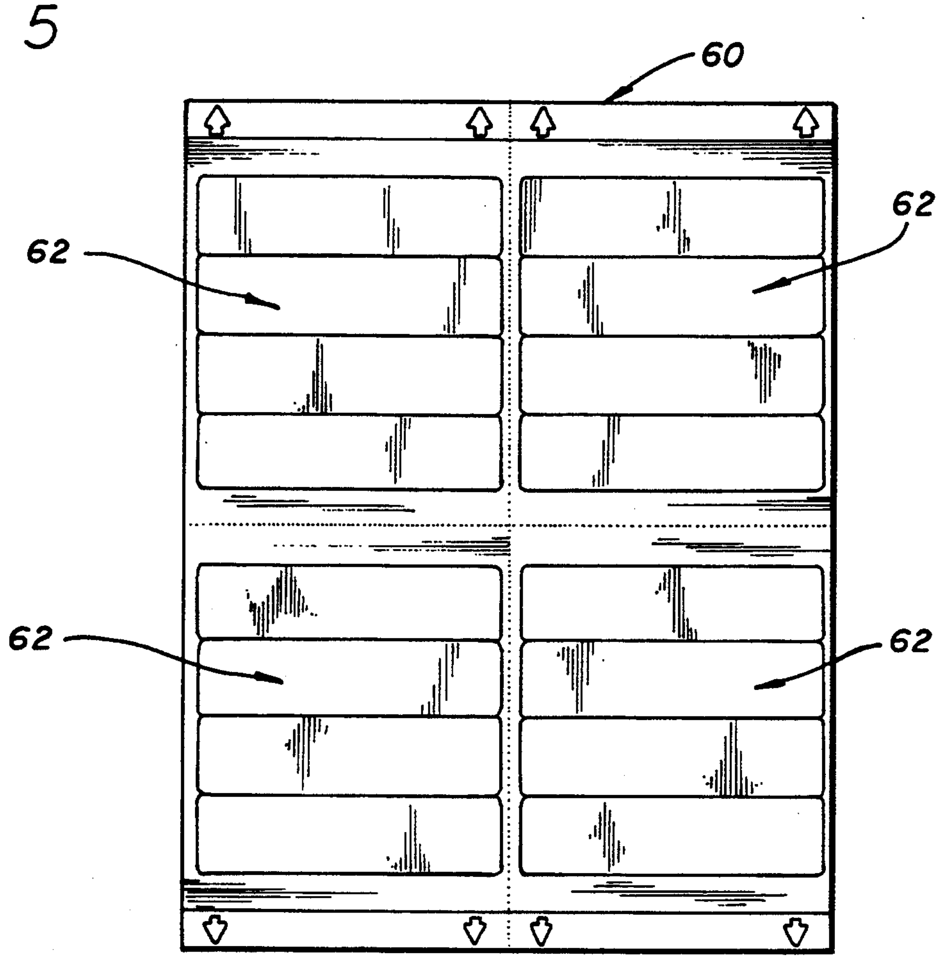
FIG. 5 is a front elevational view showing a full-sized sheet having four separable sections each having four wide labels.

FIGS. 5 and 6 illustrate alternate embodiments of the present invention. FIG. 5 illustrates a label sheet 60 having label sets 62. Each of these label sets 62 feature four labels that are considerably wider than the four labels of label set 34 of FIG. 1. Similarly, FIG. 6 illustrates a label sheet 64 having label sets 66 with three, rather than four, labels per subsection. In FIG. 6, increased flexibility is provided by the perforation lines 40' and 42' which serve substantially the same function as the die cut lines 40 and 42 of FIG. 1.

By way of example and not of limitation, the embodiment of FIG. 1 may have the following dimensions. Label sheet 20 may be a standard $8\frac{1}{2}$ by 11 inch sheet. Leading edge portion 36 may be $\frac{1}{2}$ inch long. Each subsection may be 4 inches wide by $5\frac{1}{2}$ inches long. Each label may be $2\frac{1}{2}$ inches wide by 1 inch long. Each label set 34 may be centered within a subsection, with a $\frac{1}{2}$ inch border at the top and bottom and a $\frac{3}{4}$ inch border along either side. Of course, these dimensions may be substantially varied without departing from the scope of the invention.

In conclusion, it is to be understood that the foregoing detailed description and the accompanying drawings related to preferred embodiments of the invention. Various changes and modifications may be made without departing from the spirit and scope of the invention. Thus, by way of example and not of limitation, each subsection may have any number of labels other than the three or four labels per subsection shown in the drawings. Indeed, the entire sub-section could be a single large label. Similarly, the individual labels may have any of a variety of shapes, including triangular, circular, polygonal, and so on. The full size sheets may be legal sized, may be A4 size paper, or any other desired size, such 9 inch long paper or other non-standard size sheets.

Although the embodiments described herein have featured four subsections, various other arrangements of subsections are possible. For instance, a label sheet may have six subsections, with three subsections on the top of the sheet and another three on the bottom of the sheet. Alternately, the sheet could be divided into three narrow subsections, with a single flexible leading edge along one side of the length of the sheet.

Other variations are also apparent. To increase flexibility, the lines of flexibility can be perforated instead of being die cut. The perforations may extend through just the label layer and not the backing layer, or may extend through both.

If a user wishes to print more than a single subsection at once, he or she need not break the full sheet into all of the possible subsections, but can print two adjoining subsections at the same time. The user can even put whole sheets of labels in paper tray for automatic feeding if the user wants to print several labels at once.

Additionally, the concept of providing a standard sized sheet that can be broken down into subsections for printing in a laser printer can be extended beyond use with only labels. For instance, a standard sized sheet of card stock can be perforated to form several subsections, each having a set of separable business cards rather than labels. To print only a few business cards at a time, the standard sized sheet may be broken down into the subsections, which are then fed through the manual feed guides and into the laser printer. Such sheets may have increased flexibility at the feed edges thereof by providing a perforation line similar in location to lines 40 and 42 of FIG. 1.

It should be emphasized that the divisible sheets may be provided in sizes other than 8½×11 inches. For instance, the divisible sheets may be one-half of an 8½×11 sheet, such as 4¼×11 inches or 5½×8½ inches, with flexibility provided along any desired edge of the smaller final sheets. Of course, the divisible sheets may be provided in a variety of sizes other than those specified hereinabove.

Accordingly, the present invention is not limited to the specific embodiments shown in the drawings and described in the detailed description.

What is claimed is:

1. A multiple purpose, double thickness label sheet assembly comprising:

a backing sheet having pre-defined dimensions and an upper surface;

a label sheet having a pressure sensitive adhesive coating thereon mounted on said upper surface of said backing sheet, with the adhesive facing the backing sheet, said label sheet covering substantially all of said upper surface of said backing sheet;

said double thickness label sheet assembly being divided into a plurality of sections by microperforations extending through both said label sheet and said backing sheet;

said label sheet having a flexible top leading edge and a flexible bottom leading edge, said label sheet having a first die-cut flexibility line cut into said label sheet approximately ½ inch from said top leading edge and a second die-cut flexibility line cut into said label sheets approximately ½ inch from said bottom leading edge, said flexibility lines allowing said leading edges to easily bend around the twists and turns in a conventional laser printer feed path;

each of said sections having a plurality of die cut labels thereon, with the die cuts extending through said label sheet but not through said backing sheet; and said label sheet being substantially coextensive with said backing sheet;

whereby said double thickness label sheet assembly may be printed in its entirety by a laser printer, or may be divided along said microperforations into sections which each have a flexible leading edge for individual feeding into a laser printer, and said microperforations leave substantially smooth edges when said sections are separated from one another.

2. A label sheet assembly as defined in claim 1 wherein said pressure sensitive adhesive is stable in the presence of temperatures up to 200 degrees Fahrenheit.

3. A label sheet assembly as defined in claim 1 wherein said plurality of sections constitutes two equally sized sections.

4. A label sheet assembly as defined in claim 1 wherein said labels are cut in sets, one of said sets being centered on each of said sections with at least a ½ inch border between the label set and the edges of the section.

5. A label sheet assembly as defined in claim 1 wherein said label sheet assembly has dimensions of approximately 4¼ inches wide by 10 inches long.

6. A label sheet assembly as defined in claim 1 wherein said upper surface of said backing sheet includes a release coating to permit a user to easily remove said labels from the backing layer.

7. A multiple purpose, double thickness label sheet assembly as defined in claim 1, wherein said label sheet assembly is less than approximately 5 inches wide.

8. A multiple purpose, double thickness label sheet assembly as defined in claim 1, wherein said label sheet assembly is approximately 4¼ inches wide.

9. A multiple purpose, double thickness label sheet assembly as defined in claim 1, wherein said plurality of sections constitutes two sections.

10. A multiple purpose, double thickness label sheet assembly as defined in claim 1, wherein said first die-cut flexibility line constitutes one edge of one of said die cut labels.

11. A multiple purpose, double thickness label sheet assembly at defined in claim 1, wherein said first die-cut flexibility line comprises an edge of one of said die cut labels, and said second die-cut flexibility line comprises one edge of another of said die cut labels.

* * * * *

US005389414B1

REEXAMINATION CERTIFICATE (3452nd)

United States Patent [19]

Popat

[11] B1 5,389,414

[45] Certificate Issued Mar. 3, 1998

[54] DIVISIBLE LASER LABEL SHEET

[75] Inventor: Ghanshyam H. Popat, Alta Loma, Calif.

[73] Assignee: Avery Dennison Corporation, Pasadena, Calif.

Reexamination Request:
No. 90/003,897, Jul. 19, 1995

Reexamination Certificate for:

Patent No.: 5,389,414
Issued: Feb. 14, 1995
Appl. No.: 63,213
Filed: May 17, 1993

[51] Int. Cl.$^6$ .......... B32B 31/00
[52] U.S. Cl. .......... 428/40; 428/43; 283/101; 283/103; 283/105
[58] Field of Search .......... 428/40, 41, 42, 428/43; 283/101, 103, 105, 109, 117

[56] References Cited

U.S. PATENT DOCUMENTS 5,132,915 7/1992 Goodman .

OTHER PUBLICATIONS

Avery Laser Run promotional package of literature, including: advertising brochure entitled The Ultimate Laser Label From Avery (copied as two pages); Avery laser label form stock No. 4505; Avery laser label form stock No. 4506; Avery Laser Run Desktop Printer.

Labels Product Reference Guide, form LR04 (copied as two pages); based on information and belief all published by Avery Dennison prior to 17 May 1992.

*Primary Examiner*—James J. Engel

[57] ABSTRACT

A double thickness label assembly has a label layer having a pressure sensitive adhesive mounted on a backing layer. The backing layer has a release coating for removal of the labels. The label assembly is divided into two or more sections by perforations that extend through both layers of the assembly. Each individual section is designed to have increased flexibility at its leading edge by means of die cut and/or perforated lines so that the section can feed through a laser printer without getting jammed. The user may choose to either print the sheet in its entirety, or may print one or more sections and save the remainder of the sheet for later use. A convenient method of preparing small sets of labels uses a divisible sheet of labels that is divided into sections by perforations. A user first divides the sheet into the sections. Each section includes a number of die cut labels. The user then adjusts the feeding mechanism on a laser printer to the width of the section sheets, then prints the labels on the section sheets.

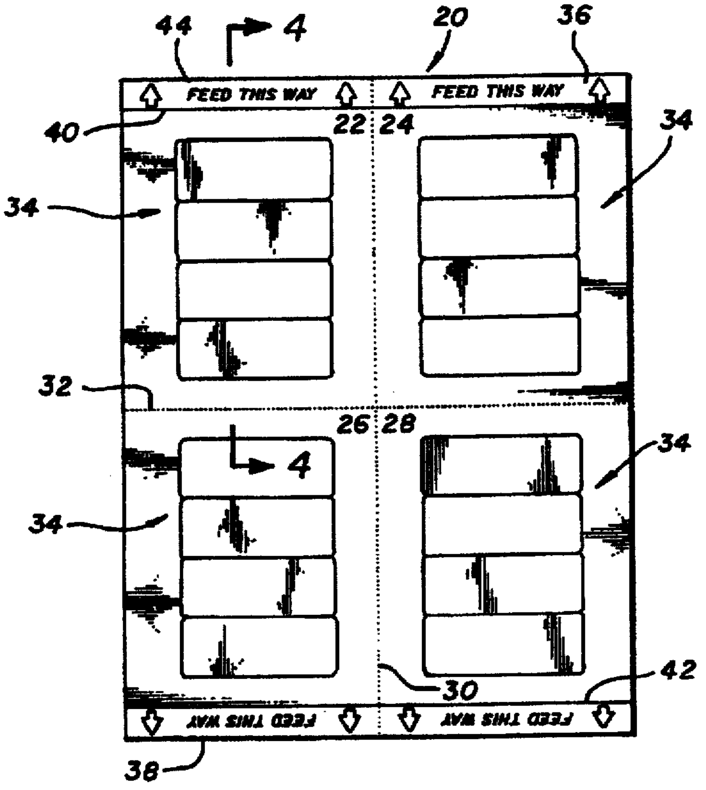

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–11 are cancelled.

* * * * *